United States Patent
Tresselt

[11] 4,115,774
[45] Sep. 19, 1978

[54] CW RADAR AM-NOISE VIDEO-CANCELLATION SYSTEM

[75] Inventor: Carl P. Tresselt, Baltimore, Md.

[73] Assignee: The Bendix Corporation, Southfield, Mich.

[21] Appl. No.: 825,311

[22] Filed: Aug. 17, 1977

[51] Int. Cl.² .............................................. G01S 7/40
[52] U.S. Cl. .................................................. 343/17.7
[58] Field of Search ....................................... 343/17.7

[56] References Cited

U.S. PATENT DOCUMENTS

| 4,021,804 | 5/1977 | Dounce et al. | 343/17.7 X |
| 4,060,806 | 11/1977 | Davies et al. | 343/17.7 |

Primary Examiner—T. H. Tubbesing
Attorney, Agent, or Firm—William G. Christoforo; Bruce L. Lamb

[57] ABSTRACT

AM noise produced by a CW or FM-CW radar transmitter can be cancelled from the radar receiver output by use of a servo system working at video frequencies. A fixed pair of AM sidebands is deliberately added to the source, using a known discrete modulating frequency. A demodulated sample of the total AM noise produced by the source is obtained from a single ended mixer. The servo system adjusts the gain of an amplifier processing this noise, until the level of the demodulated test signal is equal to the level of the demodulated test signal at the output of the radar receiver. The two video signals are then subtracted, cancelling the test tone from the receiver output and incidentally also cancelling the AM source noise from the output of the system.

13 Claims, 3 Drawing Figures

CW RADAR AM-NOISE VIDEO-CANCELLATION SYSTEM

BACKGROUND OF THE INVENTION

This invention relates to continuous wave (CW) radar systems and more particularly to means for cancelling AM noise from such systems.

In the past, CW radars have generally employed spaced-apart transmitting and receiving antennas in order to eliminate problems associated with AM noise. Specifically, radomes and other in-close reflecting objects return fairly high level AM noise contaminated signals to the antenna where a single antenna is used. It has been suggested that the use of an active RF cancellation scheme in which the magnitude and phase of reflections from close-in objects such as a radome be measured in the line leading to the receiver and a signal of equal amplitude and opposite phase be automatically generated and inserted to cancel the undesired reflection. The bandwidth of the RF cancellation path is broad enough so that AM source noise riding on the carrier would also be cancelled, and hence not able to blind the receiver. Although this scheme has worked satisfactorily under laboratory conditions, a fixed loss of three to four dB must be accepted in economically practical versions of the system to provide and process the signal which is to be reinserted for cancellation. In addition, the various microwave integrated circuit devices used in employing this scheme have exhibited significant insertion loss, which when added to the fixed processing loss mentioned above might total six dB. Unfortunately, the power levels of presently available solid state devices are not high enough to provide significant radar range in the face of such losses.

In other CW radar systems a balanced mixer is employed in the main receiver to eliminate AM noise present on the local oscillator (LO) signal. Because of the presence of reflection from the duplexer-radome combination in the single aperture FM-CW radar, however, source noise of sufficient level to jam the receiver will enter the RF port of the mixer directly along with the desired target returns. This particular condition cannot be remedied by the use of a balanced mixer.

SUMMARY OF THE INVENTION

In the embodiment to be described below, a solid state source of radar frequencies contains a varactor, enabling it to be frequency modulated to produce the range-frequency relationships of a normal FM-CW radar. A loosely coupled PIN diode, suitably located in this embodiment within the source cavity, provides low level amplitude modulation with a minimal insertion loss penalty. The modulation frequency chosen is suitably without the range of the instantaneous FM-CW radar sidebands. For reasons to be explained below, a modulation frequency of about 455 kilohertz has been chosen for the present invention. This modulation frequency also enables subsequent processing to be provided through the use of inexpensive readily available IF components. A sample of the source power is extracted and sent through a single-ended mixer with a relatively small fixed loss of source power. The single-ended mixer and the source are isolated from second order target and radome leakage by the action of a circulator placed between the mixer and the duplexing circulator of the radar. A second, single-ended, mixer is employed in the main receiver in place of the balanced mixer of the prior art. The second mixer receives its local oscillator power via a deliberate mismatch of antenna VSWR itself on the line feeding the antenna. I is used to mix the instantaneous local frequency with the frequency of the signal return. The two mixers employed are somewhat similar to one another except the crystals used therein are reversed in polarity with respect to one another.

The AM noise of the source present at both the aforementioned mixers is amplified and summed. Because of the reverse polarity of the crystals in the mixers as explained above, this amounts to a subtraction. The difference signal is amplified by a bandpass amplifier, the bandpass being equal to the introduced AM modulation, which in the present embodiment is 455 kilohertz in a phase comparator with a sample of reference signal of suitable phase and a synchronous detector. The bipolar output of this detector is used to close the servo loop via a DC amplifier which adjusts the gain of the noise sensing channel to provide a near zero 455 kilohertz difference signal.

In a second embodiment, two identical band pass amplifiers are attached to receive the outputs from the two mixers. The signals from these two amplifiers are fed into two identical detectors. The outputs of the two detectors are subtracted in a differential DC amplifier whose output controls the gain of the amplifier and the noise processing channel. In either case, while cancelling the introduced sideband, the CW radar AM noise is also cancelled. It should be noted that cancellation occurs at video frequencies rather than at RF frequencies as was generally the case in the prior art. The approach of the present inventions allows radio frequency radar plumbing to be greatly simplified and the overall system sensitivity to be improved in many system realizations.

It is an object of this invention to provide an AM noise cancellation system for CW radar which operates at video frequencies.

Another object of the invention is to provide a noise cancellation system of the type described in which the losses associated therewith are minimized.

These and other objects of the invention will become apparent to one skilled in the art from a reading and understanding of the following description of the invention.

DESCRIPTION OF THE PREFERRED EMBODIMENT OF THE INVENTION

Figure 1:
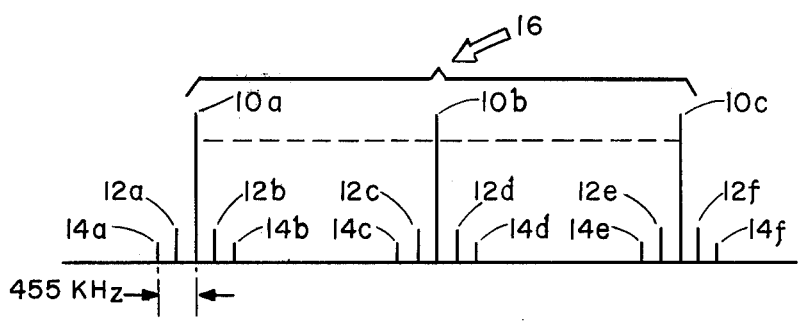
FIG. 1 is a representative frequency spectrum of a typical FM-CW radar with the introduced AM sidebands of the invention shown.
Figure 2:
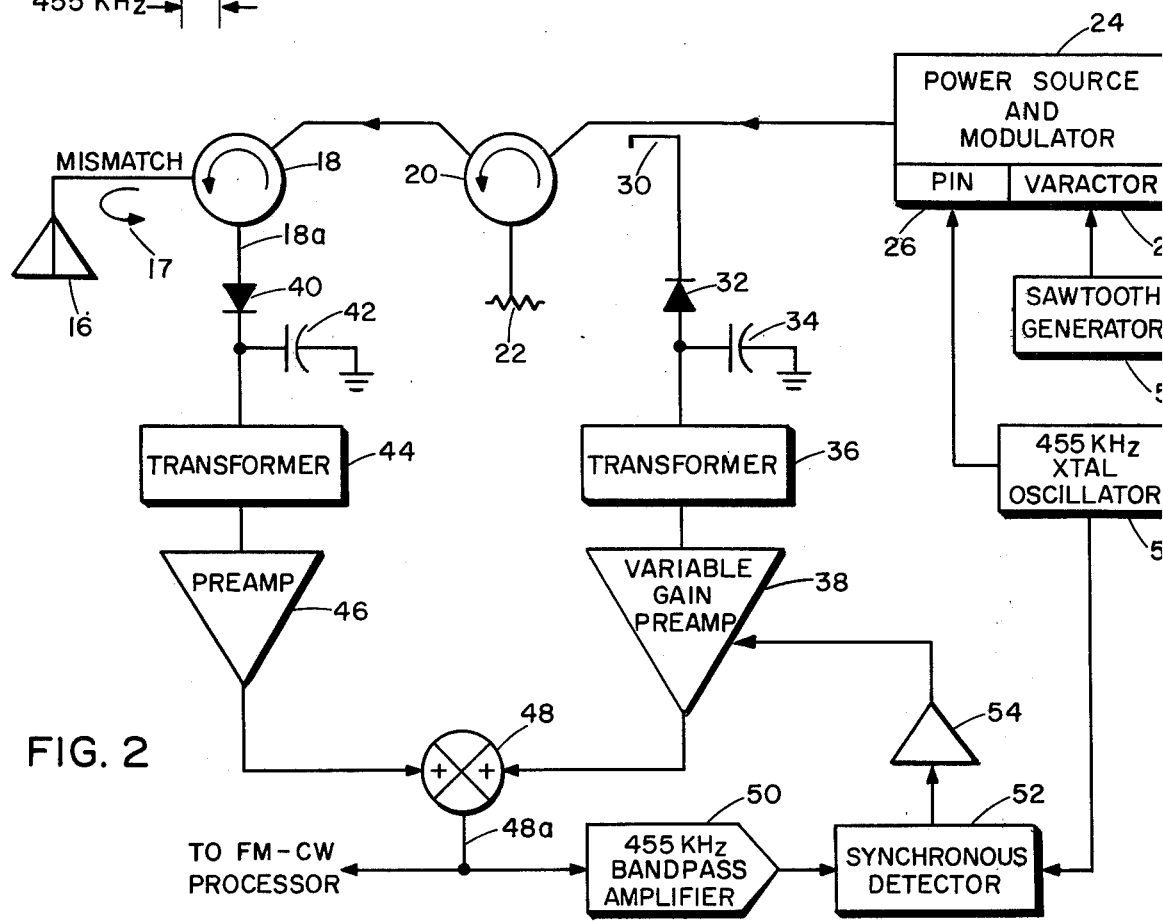
FIG. 2 is a block diagram of one embodiment of the invention.

Referring to the figures wherein like reference numerals within the various figures refer to like elements and referring particularly to FIG. 1, there is seen representative lines in the frequency spectrum of a typical FM-CW radar with the introduced AM sidebands. The frequency spectrum of the radar itself is generally represented at 16 and includes as typical spectrum lines 10a, 10b, 10c together with their AM sidebands, for example sidebands 12a, 12b, 12c, 12d, 12e and 12f. The present embodiments of the invention will be generally described in the environment of an FM-CW altitude determining radar for use in an aircraft. In that case, the frequency spectrum represented at 16 will encompass the range from 4.23 to 4.34 gigahertz in a typical altitude-determining FM-CW radar. In accordance with the principles of the present invention, AM sidebands are placed outside the range of an instantaneous spectrum line, and in particular, with respect to FIG. 1 AM sidebands 14a and 14b for spectrum line 10a, 14c and 14d for spectrum line 10b, and 14e and 14f for spectrum line 10c. As previously mentioned these AM sidebands are introduced so as to be 455 kilohertz from the instantaneous spectrum line in the present embodiment. Refer now to FIG. 2 which shows a block diagram of an embodiment of the invention wherein a power source and modulator 24 supplies power to an antenna 16 through circulators 18 and 20. Circulator 20 includes at one of its ports a matched termination 22. The power source of modulator 24 is FM modulated by a sawtooth generator 58 acting through a varactor 28 which is a part of the modulator. A 455 kilohertz crystal oscillator 56 acting through PIN diode 26 provides the aforementioned introduced AM sidebands. In the environment in which this invention is described, that is as an airborne altimeter, antenna 16 is suitably a probe fed wave guide antenna. An adjustable mismatch 17 is provided between circulator 18 and antenna 16 to return a sample of the transmitted power to the detector comprised of diode 40 and shunt capacitor 42. Of course, together with the sample provided by the adjustable mismatch 17 is the signal return received by antenna 16 and provided to the circulator 18 output port 18a. The mixed frequency products, as known to those skilled in the art to comprise a measure of the aircraft altitude, are applied through matching transformer 44 and preamplifier 46 to summing circuit 48.

A probe 30 samples the output signal from the power source and modulator 24, which sample, of course, includes a spectrum such as that seen in FIG. 1 including the AM introduced sidebands, and applies it through the mixer comprised of diode 32 and shunt capacitor 34 and through the matching transformer 36 and variable gain preamplifier 38 to summer 48. It should be noted that the polarity of diode 32 is opposite from that of diode 40 so that the action of summer 44 is actually to subtract the signal at circulator port 18a from the sample obtained by probe 30. The resultant signal from summer 48 comprises the usable altimeter signal which is applied to the FM-CW processor for processing in the manner known to those skilled in the art. The signal is also applied through a 455 kilohertz bandpass amplifier 50 to a synchronous detector 52 which also receives the 455 kilohertz signal from crystal oscillator 56. In effect, variable gain preamplifier 38, summer 48, band pass amplifier 50, synchronous detector 52 and amplifier 54 comprise a servo loop which automatically adjusts the gain of variable gain preamplifier 38 to remove the previously introduced 455 kilohertz AM sidebands from the usable signal issuing from the summer at port 48a. In removing the introduced AM sidebands, the other undesired AM modulation of the system is effectively removed from the usable signal passed to the FM-CW processor, thus accomplishing the objects of the invention.

Figure 3:
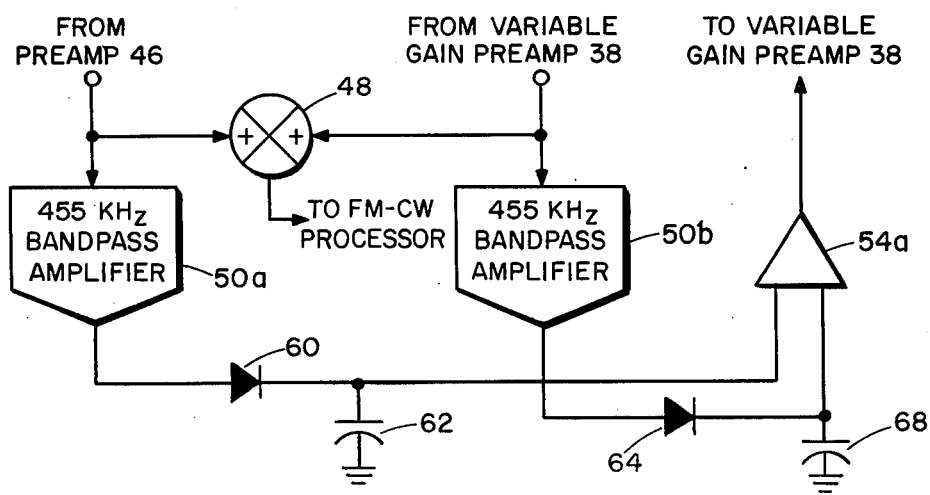
FIG. 3 is a block diagram of another embodiment of the invention.

Refer now to FIG. 3 which shows a slight modification to the embodiment of the invention of FIG. 2 wherein the signal from preamplifier 46 is summed with the signal from preamplifier 38 in summer 48 as in the previous figure to produce the usable FM-CW signal which is applied to the FM-CW processor. The embodiment differs in that the signal from preamplifier 46 is also applied through the bandpass amplifier 50a and the mixer comprised of diode 60 and shunt capacitor 62 to one input of differential amplifier 54a while the signal from variable gain preamplifier 38 is applied to bandpass amplifier 50b and the mixer comprised of diode 64 and shunt capacitor 68 to the other input of differential amplifier 54a. In this particular embodiment, the signal from differential amplifier 54a is applied to adjust the gain of variable gain preamplifier 38 of FIG. 2. It can be seen that the action of the embodiment of FIG. 3 will also be to remove the introduced AM sidebands and in like manner remove the undesired system AM modulation.

Having described the above embodiments of my invention various modifications and alterations thereof should now be obvious to one skilled in the art. Accordingly, the invention is to be limited only by the true spirit and scope of the appended claims.

The invention claimed is:

1. In a continuous wave radar system wherein means are provided for generating a continuous wave for transmission by said system and where a resultant radar return signal is received by said system, an improvement comprising:
   means for introducing predetermined amplitude modulated sidebands to said continuous wave; and,
   means for removing the amplitude modulated components in the resultant radar return signal caused by the introduced predetermined amplitude modulated sidebands.

2. The improvement of claim 1 including means for modulating the continuous wave to provide a frequency modulated continuous wave and wherein said means for introducing comprise means for introducing amplitude modulated sidebands which lie outside the instantaneous spectrum lines of the modulated continuous wave to said continuous wave.

3. In a continuous wave radar system wherein means are provided for generating a continuous wave for transmission by said system and wherein a resultant radar return signal is received by said system, an improvement comprising:
   means for deliberately adding a fixed pair of amplitude modulated sidebands to the spectrum lines of said continuous wave;
   first means for obtaining a demodulated sample of the total amplitude modulated noise produced by said means for generating;
   second means for obtaining a sample of the mixed frequency products of the instantaneously transmitted continuous wave with the resultant radar return signals;
   means for comparing said demodulated sample with said mixed frequency products to provide an error signal; and,
   means responsive to said error signal to tend to make equal the contribution of said deliberately added fixed pair of amplitude modulated sidebands in said demodulated sample to the contribution of said deliberately added fixed pair of amplitude modulated sidebands in said mixed frequency products.

4. The improvement of claim 3 wherein said means for comparing comprises means for adding said demodulated sample with said mixed frequency products, the results of the addition being the useful signal of said radar system.

5. The improvement of claim 4 wherein said first and second means comprise respectively first and second single ended mixers.

6. The improvement of claim 5 wherein the polarity of one of said first and second single ended mixers is reversed with respect to the polarity of the other of said first and second single ended mixers whereby said means for adding subtracts one signal from the other.

7. The improvement of claim 4 with additionally a band pass amplifier for passing a frequency essentially equal to the frequency of said deliberately added fixed pair of amplitude modulated sidebands, the output signal from said amplifier comprising said error signal.

8. The improvement of claim 7 wherein said first and second means comprise respectively first and second single ended mixers.

9. The improvement of claim 8 wherein the polarity of one of said first and second means is reversed with respect to the polarity of the other of said first and second means, said means for adding thereby performing an arithmetical subtraction process.

10. The improvement of claim 3 including means for modulating the continuous wave to provide a frequency modulated continuous wave and wherein said means for adding comprises means for deliberately introducing a fixed pair of amplitude modulated sidebands which lie outside the instantaneous spectrum lines of the modulated continuous wave to said modulated continuous wave.

11. The improvement of claim 10 wherein said means for comparing comprises means for adding said demodulated sample with said mixed frequency products, the results of the addition being the useful signal of said radar system.

12. The improvement of claim 11 wherein said radar system includes a single antenna for transmitting and receiving signals.

13. The improvement of claim 12 wherein said second means comprises a deliberate mismatch at said antenna whereby a sample of the signal being transmitted is returned to said first means.

* * * * *